Patented Aug. 27, 1940

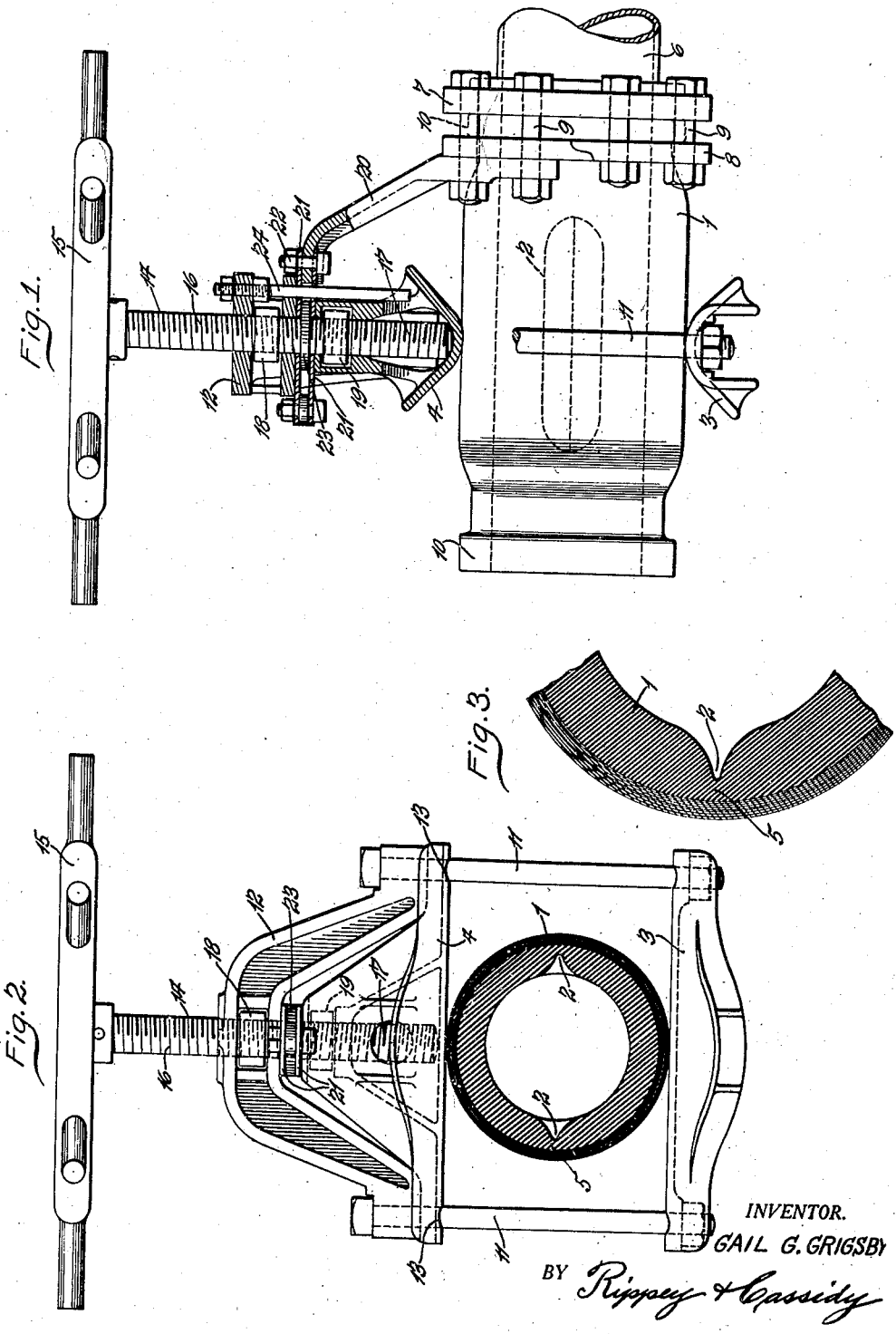
Aug. 27, 1940.   G. G. GRIGSBY   2,212,733
VALVE
Filed Dec. 9, 1937
INVENTOR.
GAIL G. GRIGSBY
BY Rippey & Cassidy
HIS ATTORNEYS.

2,212,733

UNITED STATES PATENT OFFICE 2,212,733

VALVE

Gail G. Grigsby, Desloge, Mo.

Application December 9, 1937, Serial No. 178,889

10 Claims. (Cl. 251—5)

This invention relates to a valve having a collapsible conduit.

An object of this invention is to provide a valve particularly adapted for a line carrying abrasive or erosive materials which will be simple in construction, efficient in operation, and durable in service.

Many advantages are obtained from a valve of a construction embodying the features of this invention. It operates simply by turning a hand wheel in the same manner as a conventional valve. There is but a single element which is subject to wear by fluid passing through the line. An unobstructed straight cylindrical conduit is used, hence there is absolutely no restriction to the flow through the line when the valve is open. When handling sand or slime, or other materials which cause abrasion or erosion, the wear is reduced to a minimum because a rubber conduit may be used, and what wear does occur will not damage the mechanism or interfere with the function of the valve. There is freedom from damage due to freezing. The flexible conduit permits slight variations in alignment of the line without threat of damage due to the valve, and also permits thermal expansion and contraction of the line. The valve can be attached by standard pipe fittings. There is ease of inspection because all the moving parts are on the outside of the conduit. These is ease of replacement of the mechanism, which may be removed and replaced without taking the line out of service. The mechanism is separable from the conduit and the conduit is of lighter weight than a comparable part in a metal valve; hence in large sizes, for which the valve is adapted, the ease of handling it is a definite advantage. No stuffing box is required. The valve can be operated partially open without excessive wear. And there is a low initial cost with few machined parts.

Other objects and advantages may be apparent from the following detail description, taken in connection with the accompanying drawing, or may be inherent in the device. The invention comprises the parts and their association and arrangement specifically pointed out in the appended claims, while the drawing and following description illustrate and describe specifically only a preferred embodiment of the invention.

Fig. 1 is a side elevation of a valve embodying this invention, partly in section;

Fig. 2 is an end elevation with the conduit in section; and,

Fig. 3 is a detail cross section of the conduit.

A conduit 1 is of fabric-reinforced rubber with the fabric embedded in and vulcanized to the rubber; the fabric layers, as best shown in Fig. 3, being on the exterior portion of the conduit. Axially extended V-shaped grooves 2 are provided on the interior of the conduit and are diametrically opposed to each other. The conduit is so positioned with respect to collapsing members or clamps 3 and 4 that the grooves 2 lie 90 degrees from the points of contact between the conduit and the collapsing members, or clamps. The grooves form fold or hinge lines and reduce, or practically eliminate, breaking of the fabric when the conduit is flexed. For instance, in a valve of large dimension the fabric ordinarily would be bent on a half inch radius in order to collapse the conduit, but with the use of the grooves forming fold lines this radius is increased to two inches.

It will be understood that the interior of the conduit adjacent the groove has a thickness of rubber in excess of that usually required for the diameter and intended pressure. The thickness of the inner portion of the rubber, indicated by the numeral 5, Fig. 3, between the inner line of the groove 2 and the fabric reinforcement, is substantially equal to that which would ordinarily be required in such a conduit. That is to say, the conduit is not weakened by the insertion of the grooves, but rather the grooves are formed by building up the interior of the conduit with an excess of free rubber.

The outer diameter of the conduit member 1 is not uniform but has its central portion adjacent the grooves 2 greater than that of the end portions, so that the length of the reinforcing fabric 5 is greater than the straight line or the length of the conduit. Thus if both ends of the conduit are secured in a pipe line, as they may be, the conduit may be compressed without placing any undue strain on its ends and without breaking the fabric.

The conduit member 1 may be secured in or to a pipe line 6, by any convenient means. As specifically shown, a standard flange coupling 7 is attached to the pipe 6 while a split ring 8 is clamped to the coupling 7 by bolts 9 to hold a circumferential flange 10 on the end of the conduit between the ring 8 and the face of the coupling 7. It will be understood, however, that no invention is claimed in the means of coupling per se, and that no particular type of coupling is essential. In one aspect of the invention, however, a rigid coupling serves as a support for and to position the collapsing mechanism.

The conduit 1 is collapsed, as stated, by a lower clamp 3 and an upper clamp 4. The lower clamp 3 is carried by a pair of parallel rods or bolts 11 running between the lower clamp 3 and the yoke 12. The rods 11 extend through holes 13 at the ends of the upper clamp 4. Thus the ends of the upper clamp 4 with the holes 13 comprise guides for the rods 11 and keep the clamps 3 and 4 as well as the yoke 12 in alignment.

Means are provided for moving the clamps 3 and 4 simultaneously to or from each other, or more directly, for moving the clamp 4 and the yoke 12 toward and from each other. These means include a jack screw 14, to which is attached a hand wheel 15 and which has right hand threads on its upper section 16 and left hand threads on its lower section 17, for engagement respectively with follower nuts 18 and 19. The follower nut 18 is positioned in a pocket of the yoke 12 and the nut 19 is located in the frame of the upper clamp 4. Thus it may be understood that upon rotation of the hand wheel 15 in a clockwise direction the yoke 12, and therefore the clamp 3, will be raised while the clamp 4 will be depressed to clamp or collapse the conduit 1, and upon rotation in a counter clockwise direction the clamps may be moved apart to release the conduit.

The mechanism just described for collapsing the valve is rigidly supported by a bracket 20, which is secured to the coupling heretofore described by some of the bolts 9, as clearly shown in Fig. 1. The bracket 20 carries a pair of parallel spaced plates 21 secured to the bracket by bolts 22, and in which is journalled the jack screw 14, and a circumferential flange 23 on the jack screw is positioned between the plates 21, to hold the screw against axial movement. In order to hold the movable parts in proper alignment with the support or bracket and properly positioned with respect to the conduit, a king pin 24 is rigidly secured to the yoke 12, and extends downwardly through holes in the plates 21, which are in effect a continuation of the bracket 20. It will be understood that the mechanism is supported with respect to the conduit by the engagement of the bracket with the circumferential flange 23 and is held in alignment by the king pin 24. Therefore, upon movement of the jack screw the clamps are positively, evenly and simultaneously moved toward the horizontal diameter of the conduit.

The arrangement as specifically shown and described is satisfactory for operating a valve in which the diameter is not more than eight inches with an internal pressure of not more than 100 pounds. In excess of such a diameter and pressure other means may be employed for operating the mechanism. Differential jack screws may be used and their method of application to the present structure will be understood by those skilled in the art. Or a worm or worm wheel may be used in place of the hand wheel 15.

It will be apparent from the foregoing description that the invention accomplishes its objects with the advantages hereinabove stated. A preferred embodiment has been illustrated and described, but it will be understood that various changes may be made in the details of construction, within the scope of the appended claims, without departing from the spirit of this invention, and that parts of the invention may be used without the whole.

I claim:

1. A valve comprising a reinforced collapsible conduit, a rigid coupling for the conduit, a pair of opposed clamps positioned for collapsing the conduit, a bracket carried by said coupling, and means supported by the bracket for simultaneously moving said clamps toward or from each other, said conduit having internal diametrically opposed grooves approximately 90 degrees removed from the points of contact between the conduit and the clamps and forming hinge lines.

2. In a valve, a collapsible conduit element comprising rubber reinforced with one or more layers of fabric throughout its entire area, the fabric lying adjacent the outer surface of the conduit with a layer of free rubber of substantial thickness inside the fabric, and having diametrically opposed axially extending V-grooves stopping short of the ends of the element in the layer of free rubber forming hinge lines.

3. A valve comprising a collapsible conduit, a pair of opposed clamps for collapsing said conduit, a rigid support fixed with respect to the conduit, a jack screw journalled on and positioned axially by the support and having threads of one direction on one portion and threads of opposed direction on the other portion, and follower nuts on said portions respectively and associated with said clamps whereby upon rotation of the screw the clamps will be moved toward or from each other simultaneously.

4. A valve comprising a collapsible conduit, a bottom clamp and a top clamp for collapsing said conduit, a yoke above the top clamp, rods supporting the bottom clamp from said yoke, guides on the top clamp engaging the rods, a jack screw having threads of one direction on one portion and threads of opposed direction on the other portion, and follower nuts on said portions and associated respectively with the yoke and the top clamp, whereby upon rotation of the screw the yoke and top clamp and thereby the clamps will be moved toward or from each other simultaneously.

5. A valve comprising a collapsible conduit, a pair of opposed clamps for collapsing said conduit, a bracket rigidly supported at one end of the conduit and overhanging the conduit, and means carried by said bracket for simultaneously moving said clamps toward and from each other, said conduit having diametrically opposed internal grooves approximately 90 degrees removed from the points of contact between the conduit and the clamps and forming hinge lines.

6. A valve comprising a collapsible conduit, a bottom clamp and a top clamp for collapsing said conduit, a yoke above the top clamp, rods supporting the bottom clamp from said yoke, a rigid support, and means carried by said support for moving the yoke and the top clamp simultaneously toward or from each other.

7. A valve comprising a collapsible conduit, a bottom clamp and a top clamp for collapsing said conduit, a yoke about the top clamp, rods supporting the bottom clamp from said yoke, guides on the top clamp engaging the rods, a rigid support, a jack screw journalled on and positioned axially by the support, threads of one direction on one portion of the jack screw and threads of opposed direction on the other portion, and follower nuts on said portions respectively and associated with the yoke and the top clamp, whereby upon rotation of the screw the clamps will be moved toward or from each other simultaneously.

8. In a valve, a collapsible conduit, a pair of traveling members for collapsing said conduit, a support, means carried by the support for simultaneously collapsing the conduit, means for guiding one of said members with respect to the other, and a king pin associated with the support and one of the traveling members for holding the same in alignment.

9. A valve comprising a collapsible conduit, a bottom clamp and a top clamp for collapsing said conduit, a yoke above the top clamp, rods supporting the bottom clamp from said yoke, guides on the top clamp engaging the rods, a rigid support, a jack screw journalled on and axially positioned by said support for moving said yoke and top clamp, and a king pin associated with the support and the yoke for holding the same in alignment.

10. In a valve, a collapsible conduit element having a central portion of greater outside diameter than end portions and comprising rubber reinforced with one or more layers of fabric throughout its entire area, the fabric lying adjacent the outer surface of the conduit with a layer of free rubber inside the fabric providing a substantially constant inside diameter for the fabric, and having diametrically opposed axially extending V-grooves in the layer of free rubber at said central portion forming hinge lines.

GAIL G. GRIGSBY.